(12) United States Patent
Jaschke

(10) Patent No.: US 10,639,979 B1
(45) Date of Patent: May 5, 2020

(54) RETRACTABLE CANOPY ASSEMBLY

(71) Applicant: John C. Jaschke, Maurice, LA (US)

(72) Inventor: John C. Jaschke, Maurice, LA (US)

( * ) Notice: Subject to any disclaimer, the term of this patent is extended or adjusted under 35 U.S.C. 154(b) by 67 days.

(21) Appl. No.: 16/126,094

(22) Filed: Sep. 10, 2018

Related U.S. Application Data

(60) Provisional application No. 62/556,671, filed on Sep. 11, 2017.

(51) Int. Cl.
*B60J 7/12* (2006.01)

(52) U.S. Cl.
CPC ....... *B60J 7/1278* (2013.01); *B60Y 2200/147* (2013.01)

(58) Field of Classification Search
CPC .................... B60J 7/1278; B60Y 2200/147
See application file for complete search history.

(56) References Cited

U.S. PATENT DOCUMENTS

| 4,067,601 | A | 1/1978 | Tuerk |
| 5,839,462 | A * | 11/1998 | Randall ..................... E04H 6/04 |
| | | | 135/128 |
| 6,092,856 | A | 7/2000 | Ladensack |
| 7,107,926 | B2 | 9/2006 | Fishburn |
| 7,374,225 | B2 | 5/2008 | Petelka |
| 7,950,342 | B2 | 5/2011 | Russikoff |
| 8,403,396 | B2 | 3/2013 | Wensing et al. |
| 8,752,498 | B1 | 6/2014 | Schwindaman et al. |
| 9,809,095 | B1 | 11/2017 | Demonte et al. |
| 2004/0069338 | A1 * | 4/2004 | Koss ..................... E04H 15/06 |
| | | | 135/88.08 |

FOREIGN PATENT DOCUMENTS

GB     2022523 A * 12/1979 ............ B60J 7/1278

* cited by examiner

*Primary Examiner* — Lori L Lyjak
(74) *Attorney, Agent, or Firm* — Renner Kenner Law Firm

(57) ABSTRACT

A retractable canopy assembly includes a retractable canopy frame having a first bow, a second bow, and a pair of connecting segments. The first bow, second bow, and connecting segments may be coupled with a fixed frame. In a first, open position of the retractable canopy frame, a canopy carried by the retractable canopy frame covers and protects contents within a transport apparatus to which the retractable canopy frame is coupled. In a second, closed position of the retractable canopy frame, the first bow, second bow, and pair of connecting segments generally align with respective portions of the fixed frame.

19 Claims, 13 Drawing Sheets

RETRACTABLE CANOPY ASSEMBLY

CROSS REFERENCE TO RELATED APPLICATIONS

This application claims the benefit of U.S. Provisional Patent Application No. 62/556,671, filed Sep. 11, 2017, which is incorporated herein by reference.

FIELD OF THE INVENTION

The present invention relates to a retractable canopy assembly. The retractable canopy assembly includes a retractable canopy frame that may be coupled with a frame and may carry a canopy for a particular purpose of covering and protecting contents within a transport apparatus to which the retractable canopy frame is coupled.

BACKGROUND OF THE INVENTION

When transporting items, conventional methods generally include the use of either an open trailer or a solid enclosed trailer. Open trailers have the disadvantage of leaving the carried items open to line of sight, precipitation, and sun damage. Enclosed trailers can be significantly more expensive and also have the disadvantage of extra weight provided by the solid structure.

Other trailer covers have been proposed. For example, U.S. Pat. No. 6,092,856 discloses a canopy style trailer cover including a plurality of U-shaped frame members, each having a pair of opposing arms that terminate at a distal end. The respective ends are pivotally joined to the side of a trailer. A cover member having a substantially semi-circular cross-sectional configuration is mounted over the frame members. The cover can be pivoted and collapsed toward the rear of the trailer in an accordion style fashion.

U.S. Pat. No. 7,374,225 discloses a tarpaulin system including a plurality of inverted U-shaped support bows extending laterally across a trailer and secured to sections of the tarpaulin. Each support bow has rollers secured thereto for sliding movement along rails on each side of the trailer. A plurality of pairs of inverted U-shaped uplifting bows also extend laterally across the trailer and are pivotally secured to the support bows on opposite sides to spread apart during opening of the system. Intermediate support rods are secured between adjacent pairs of uplifting bows and extend laterally across the trailer between the uplifting bows beneath the tarpaulin sections to restrict the tarpaulin sections from falling between the uplifting bows when the system is closed.

However, these and other known trailer covers suffer from one or more disadvantages. These disadvantages include difficulty in installing and removing the cover or tarpaulin, insecurely affixed cover or tarpaulin, costly manufacturing, or insufficiently enclosing the area above the transported items. Thus, there remains a need in the art for an improved retractable canopy assembly for protecting transported items.

SUMMARY OF THE INVENTION

In a first embodiment, the present invention provides a retractable canopy assembly comprising a pair of fixed frame sidewalls each having a front end, a central portion, and a rear end, a retractable canopy frame having a first bow having a pair of first bow straight bracket members joined by a first bow curved member, a second bow having a pair of second bow straight bracket members joined by a second bow curved member, and a pair of connecting segments each having a first distal end coupled with the central portion of a respective sidewall of the pair of sidewalls and a second distal end coupled with a respective first bow straight bracket member of the pair of first bow straight bracket members, wherein, in a first, open position of the retractable canopy frame, the pair of first bow straight bracket members are coupled with the front end of a respective sidewall of the pair of sidewalls, and the pair of second bow straight bracket members are coupled with the rear end of a respective sidewall of the pair of sidewalls, wherein, in a second, closed position of the retractable canopy frame, the pair of first bow straight bracket members, the pair of second bow straight bracket members, and the pair of connecting segments are at least substantially parallel with a respective sidewall of the pair of sidewalls.

In a second embodiment, the present invention provides a retractable canopy assembly as in any of the above embodiments, the first bow curved member including a straight portion and the second bow curved member including a straight portion, a front fixed frame wall extending between the pair of fixed frame sidewalls, wherein, in the second, closed position of the retractable canopy frame, the straight portion of the first bow curved member and the straight portion of the second bow curved member are at least substantially parallel with the front fixed frame wall.

In a third embodiment, the present invention provides a retractable canopy assembly as in any of the above embodiments, the pair of sidewalls and the front fixed frame wall being provided by a transport apparatus adapted to receive contents therein, the retractable canopy frame carrying a canopy to thereby cover and protect the contents within the transport apparatus when retractable canopy frame is in the first, open position.

In a fourth embodiment, the present invention provides a retractable canopy assembly as in any of the above embodiments, the canopy traveling with the retractable canopy frame when retractable canopy frame is moved between the first, open position and the second, closed position.

In a fifth embodiment, the present invention provides a retractable canopy assembly as in any of the above embodiments, the canopy having an interior with a plurality of channels formed therein, at least a portion of the straight portion of the first bow curved member positioned in a first channel of the plurality of channels, and at least a portion of the straight portion of the second bow curved member positioned in a second channel of the plurality of channels.

In a sixth embodiment, the present invention provides a retractable canopy assembly as in any of the above embodiments, the plurality of channels including temporary fasteners, such that the retractable canopy frame is completely assembled prior to positioning the portion of the straight portion of the first bow curved member in the first channel and the portion of the straight portion of the second bow curved member in the second channel.

In a seventh embodiment, the present invention provides a retractable canopy assembly as in any of the above embodiments, the plurality of channels being formed as unitary components, such that the portion of the straight portion of the first bow curved member and the portion of the straight portion of the second bow curved member are positioned in the first channel and the second channel, respectively, prior to complete assembly of the retractable canopy frame.

In an eighth embodiment, the present invention provides a retractable canopy assembly as in any of the above embodiments, the straight portion of the first bow curved member extending between two curved first bow portions and having a channel at an end thereof, the pair of first bow straight bracket members having a channel at an end thereof, the curved first bow portions having a mating protrusion at each end thereof, the mating protrusions adapted to securely mate with a respective one of the channels.

In a ninth embodiment, the present invention provides a retractable canopy assembly comprising a fixed frame, a retractable canopy frame having a first major bow removably coupled with the fixed frame and removably coupled with a first pair of connecting segments, the first pair of connecting segments further fixedly coupled with a second pair of connecting segments, the second pair of connecting segments further fixedly coupled with the first major bow, the fixed frame, and a third pair of connecting segments, the third pair of connecting segments further fixedly coupled with a second major bow, the second major bow further removably coupled with the fixed frame, wherein the removable coupling of the first major bow with the fixed frame, the first major bow with the first pair of connecting segments, and the second major bow with the fixed frame are such that the retractable canopy frame is movable between an open position and a closed position.

In a tenth embodiment, the present invention provides a retractable canopy assembly as in any of the above embodiments, wherein the removable coupling being coupled defines the open position and the removable coupling being uncoupled defines the closed position.

In an eleventh embodiment, the present invention provides a retractable canopy assembly as in any of the above embodiments, wherein the second major bow is further fixedly coupled with a first minor bow.

In a twelfth embodiment, the present invention provides a retractable canopy assembly as in any of the above embodiments, wherein the second pair of connecting segments are further fixedly coupled with a second minor bow.

In a thirteenth embodiment, the present invention provides a retractable canopy assembly as in any of the above embodiments, wherein the third pair of connecting segments are further fixedly coupled with a third minor bow.

In a fourteenth embodiment, the present invention provides a retractable canopy assembly as in any of the above embodiments, wherein the second major bow is further fixedly coupled with a fourth minor bow.

In a fifteenth embodiment, the present invention provides a retractable canopy assembly as in any of the above embodiments, wherein the removable coupling of the first major bow with the fixed frame, the first major bow with the first pair of connecting segments, and the second major bow with the fixed frame include respective anchors each having a base with one or more mounting holes adapted to receive a securement member to thereby fixedly secure the anchors to the respective component, and a pair of upright walls extending from the base and each having a securing hole to thereby receive a temporary securement member.

In a sixteenth embodiment, the present invention provides a retractable canopy assembly as in any of the above embodiments, wherein the temporary securement members positioned in the securing holes defines the removable coupling being coupled, and wherein the temporary securement members not positioned in the securing holes defines the closed position.

In a seventeenth embodiment, the present invention provides a retractable canopy assembly as in any of the above embodiments, further comprising a retaining sleeve to thereby retain the retractable canopy frame in the closed position, the retaining sleeve including a pair of opposed side surfaces foldable about a base, each of the opposed side surfaces including a hole for receiving one of the temporary securement members when not positioned in the securing holes.

In an eighteenth embodiment, the present invention provides a retractable canopy assembly as in any of the above embodiments, the temporary securement members selected from the group consisting of clevis fasteners and snapper pins.

In a nineteenth embodiment, the present invention provides a retractable canopy assembly as in any of the above embodiments, further comprising a U-shaped protective jacket for protecting the retractable canopy frame when retractable canopy frame is in the closed position.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

With reference to the Figures, embodiments of the present invention provide a retractable canopy assembly 10. Retractable canopy assembly 10 includes a retractable canopy frame 12 coupled with a fixed frame 14. For purposes of this specification, the term "retractable" may be defined as the ability to move between a first, open position and a second, closed position. Such is further defined herein.

Figure 1:
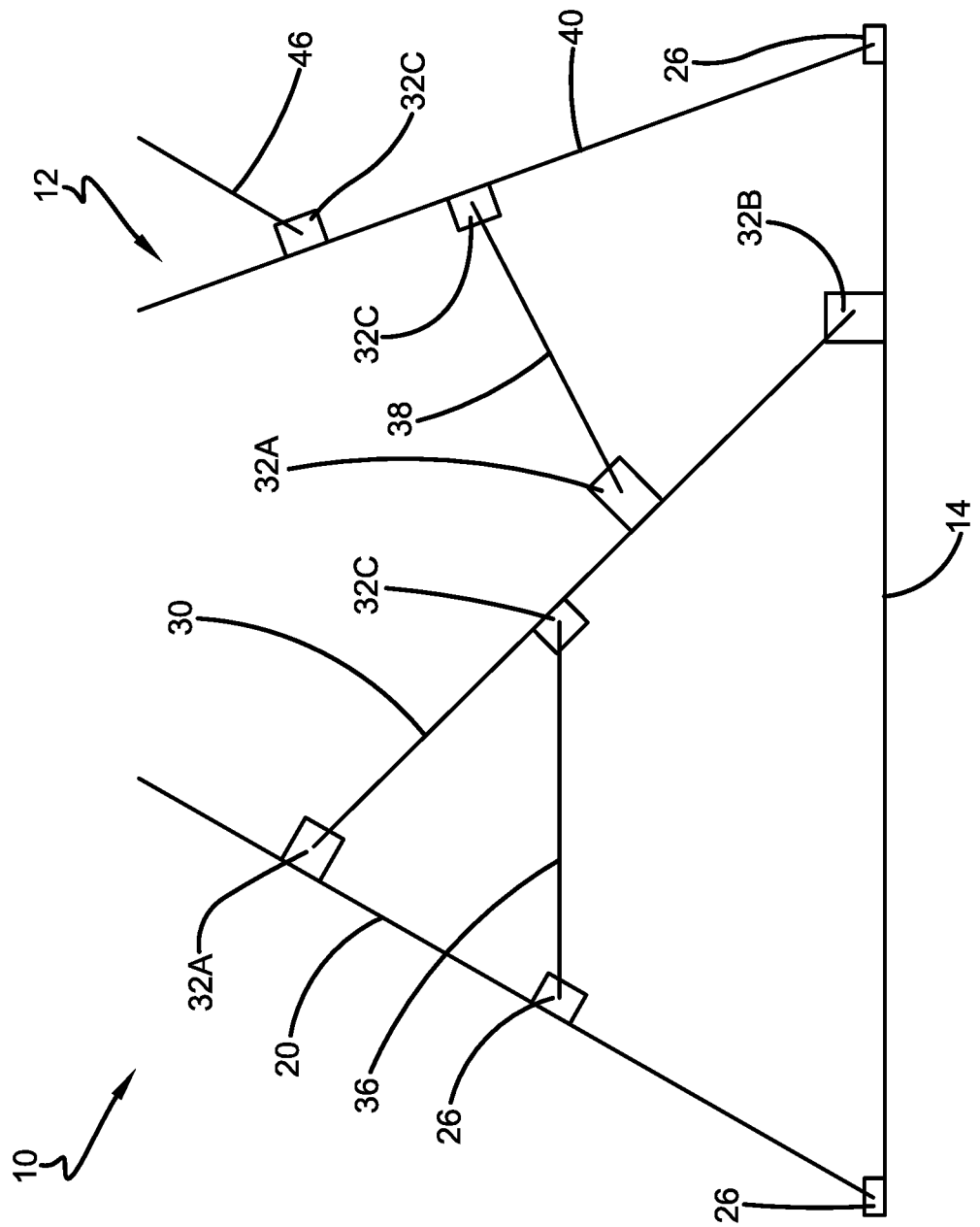
FIG. 1 is a schematic elevational view of a retractable canopy assembly showing a retractable canopy frame in a first, open position.
Figure 2:
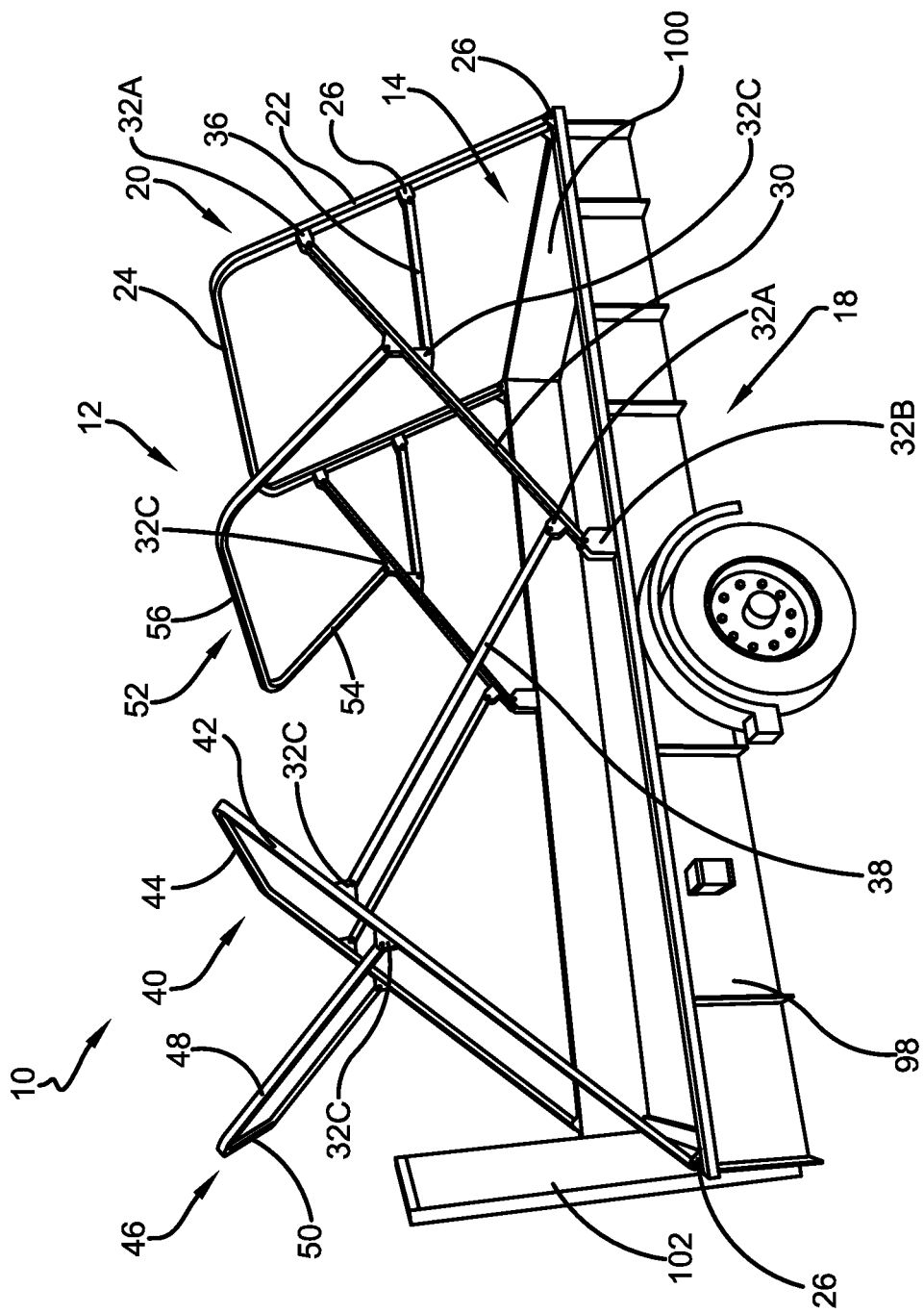
FIG. 2 is a perspective view of a retractable canopy assembly made in accordance with other embodiments of the invention showing a retractable canopy frame in a first, open position coupled with a transport apparatus.
Figure 3:
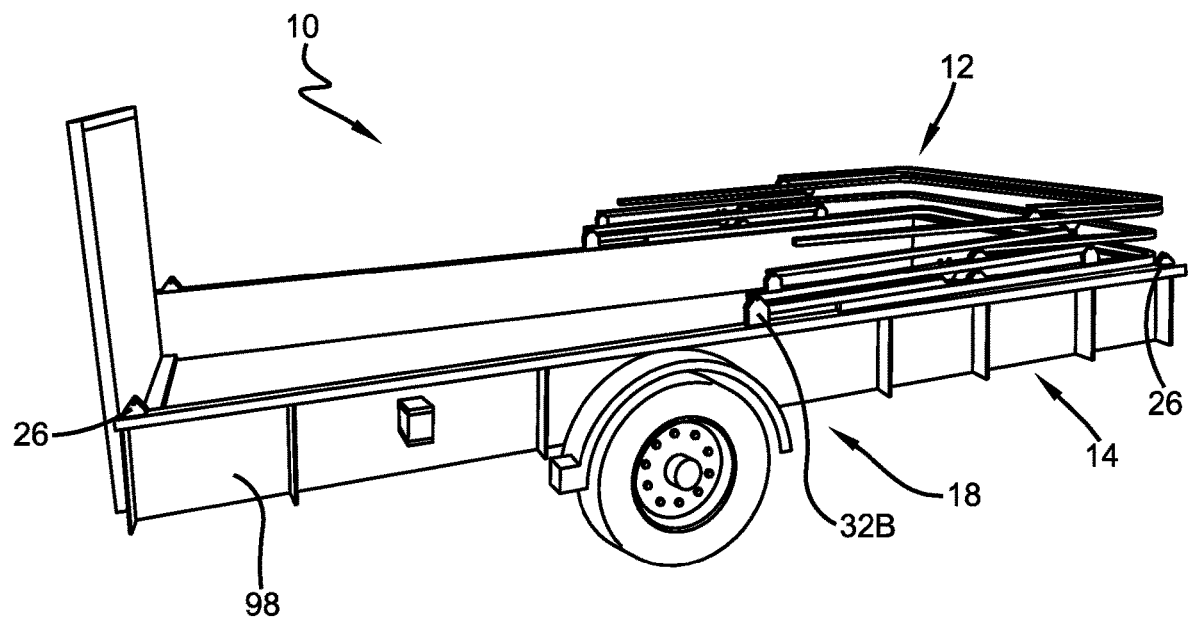
FIG. 3 is a perspective view of the retractable canopy assembly of FIG. 2, showing the retractable canopy frame in a second, closed position.

Retractable canopy frame 12, which may be described as retractable frame 12 or frame 12, may carry a canopy 16, which may also be described as a cover 16, for a particular purpose of covering and protecting contents within a transport apparatus 18, for example, trailer 18 or a boat, when retractable canopy frame 12 is in a first, open position (e.g. FIG. 1 and FIG. 2). When retractable canopy frame 12 is in a second, closed position (e.g. FIG. 3 and FIG. 4), all bows and connecting segments of retractable canopy frame 12 may be aligned with the front portion of the perimeter (i.e. the front semiperimeter, or substantial semiperimeter) of fixed frame 14. This may also be described as bows and connecting segments of retractable canopy frame 12 being parallel, or substantially parallel, with the respective portions of fixed frame 14. This may also be described as bows and connecting segments of retractable canopy frame 12 folding to rest evenly on the frame rail.

Retractable canopy frame 12 includes a first major bow 20 formed of a pair of straight bracket members 22 joined by a curved member 24 having a straight portion joining two curved portions. Straight bracket members 22 each extend into a respective curved portion of curved member 24. First major bow 20 may therefore be described as having an inverted U-shape.

In the first, open position of retractable canopy frame 12, each of straight bracket members 22 is coupled with fixed frame 14 at respective first distal ends of straight bracket members 22. The coupling of straight bracket members 22 with fixed frame 14 may be at or near the front corners of a rectangular perimeter of fixed frame 14. The coupling of straight bracket members 22 with fixed frame 14 may be by way of respective temporary anchors 26 receiving temporary securement members 28, such as pins 28. For purposes of this specification, the term "temporary" may be defined as the ability to remove and reinsert a securement member from the anchor for moving between the first, open position and the second, closed position. When pins 28 are in position through holes within bracket members 22 and anchor 26, bracket members 22 will be secured with fixed frame 14 for maintaining retractable canopy frame 12 in the first, open position. Pins 28 may then be removed from bracket members 22 and anchor 26 to allow retractable canopy frame 12 to be moved to the second, closed position.

Each of straight bracket members 22 includes a first surface having a pair of connecting segments 30 coupled therewith and extending therefrom. Each of connecting segments 30 is coupled with a respective one of straight bracket members 22 at respective first distal ends of connecting segments 30. The coupling of connecting segments 30 with straight bracket members 22 may be by way of respective rotation anchors 32A receiving permanent securement members 34. For purposes of this specification, the term "rotation" may be defined as the anchor allowing the ability to rotate components about the anchor for moving between the first, open position and the second, closed position. For purposes of this specification, the term "permanent" may be defined as the securement member, such as a pin or bolt, does not need to be removed from the bracket in order to move between the first, open position and the second, closed position. The permanent securement members may be otherwise removable, such as for disassembly and replacement.

In the open position, connecting segments 30 extend from the first distal end toward fixed frame 14 where respective second distal ends of connecting segments 30 are coupled with fixed frame 14. The coupling of connecting segments 30 with fixed frame 14 may be by way of respective rotation anchors 32B receiving permanent securement members 34.

In the open position, a pair of connecting segments 36 are also coupled with and extend from the respective first surfaces of straight bracket members 22. Each of connecting segments 36 is coupled with a respective one of straight bracket members 22 at respective first distal ends of connecting segments 36. The coupling of connecting segments 36 with straight bracket members 22 may be by way of respective temporary anchors 26 receiving temporary securement members 28. When pins 28 are in position through holes within bracket members 36 and anchor 26, bracket members 36 will be secured with straight bracket members 22 for maintaining retractable canopy frame 12 in the first, open position. Pins 28 may then be removed from bracket members 36 and anchor 26 to allow retractable canopy frame 12 to be moved to the second, closed position.

Connecting segments 36 extend from the first distal end toward connecting segments 30 where respective second distal ends of connecting segments 36 are coupled with a respective first surface of connecting segments 30. The coupling of connecting segments 36 with respective first surfaces of connecting segments 30 may be by way of respective rotation anchors 32C receiving permanent securement members 34.

Connecting segments 30 have respective second surfaces opposed to the first surfaces thereof, the second surfaces each having a respective one of a pair of connecting segments 38 coupled therewith and extending therefrom. The coupling of connecting segments 38 with respective second surfaces of connecting segments 30 may be at first distal ends thereof by way of respective rotation anchors 32A receiving permanent securement members 34.

Connecting segments 38 extend from the first distal end toward a second major bow 40 where respective second distal ends of connecting segments 38 are coupled with a respective first surface of second major bow 40, particularly a respective first surface of straight bracket members 42. Second major bow 40 may be formed of a pair of straight bracket members 42 joined by a curved member 44 having a straight portion joining two curved portions. Straight bracket members 42 each extend into a respective curved portion of curved member 44. Second major bow 40 may therefore be described as having an inverted U-shape. The coupling of connecting segments 38 with respective first surfaces of second major bow 40 may be by way of respective rotation anchors 32C receiving permanent securement members 34.

In the first, open position of retractable canopy frame 12, each of straight bracket members 42 is coupled with fixed frame 14 at respective first distal ends of straight bracket members 42. The coupling of straight bracket members 42 with fixed frame 14 may be at or near the rear corners of a rectangular perimeter of fixed frame 14. The coupling of straight bracket members 42 with fixed frame 14 may be by way of respective temporary anchors 26 receiving temporary securement members 28, such as pins 28. When pins 28 are in position through holes within bracket members 42 and anchor 26, bracket members 42 will be secured with fixed frame 14 for maintaining retractable canopy frame 12 in the first, open position. Pins 28 may then be removed from bracket members 42 and anchor 26 to allow retractable canopy frame 12 to be moved to the second, closed position.

Straight bracket members 42 have respective second surfaces opposed to the first surfaces thereof, the second surfaces each having a first minor bow 46 coupled therewith and extending therefrom. First minor bow 46 may be formed of a pair of straight bracket members 48 joined by a curved member 50 having a straight portion joining two curved portions. Straight bracket members 48 each extend into a respective curved portion of curved member 50. First minor bow 46 may therefore be described as having an inverted U-shape. The coupling of straight bracket members 48 at first distal ends thereof with respective second surfaces of straight bracket members 42 may be by way of respective rotation anchors 32C receiving permanent securement members 34.

Figure 5:
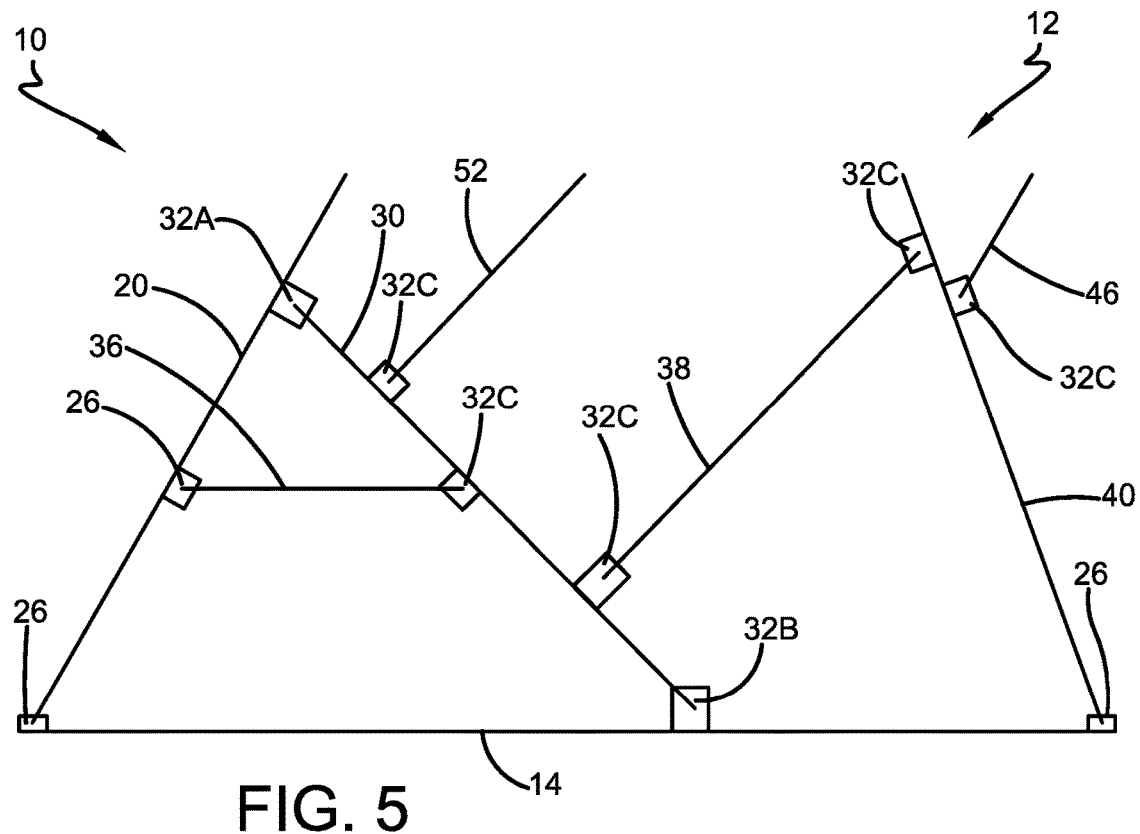
FIG. 5 is a schematic elevational view the retractable canopy assembly of FIG. 2 showing the retractable canopy frame in a first, open position.

As seen in FIG. 2 and FIG. 5, in one or more embodiments, retractable canopy frame 12 may include a second minor bow 52 coupled with and extending from the second surfaces of connecting segments 30. Second minor bow 52 may be formed of a pair of straight bracket members 54 joined by a curved member 56 having a straight portion joining two curved portions. Straight bracket members 54 each extend into a respective curved portion of curved member 56. Second minor bow 52 may therefore be described as having an inverted U-shape. The coupling of straight bracket members 54 at first distal ends thereof with respective second surfaces of connecting segments 30 may be by way of respective rotation anchors 32C receiving permanent securement members 34.

Figure 6:
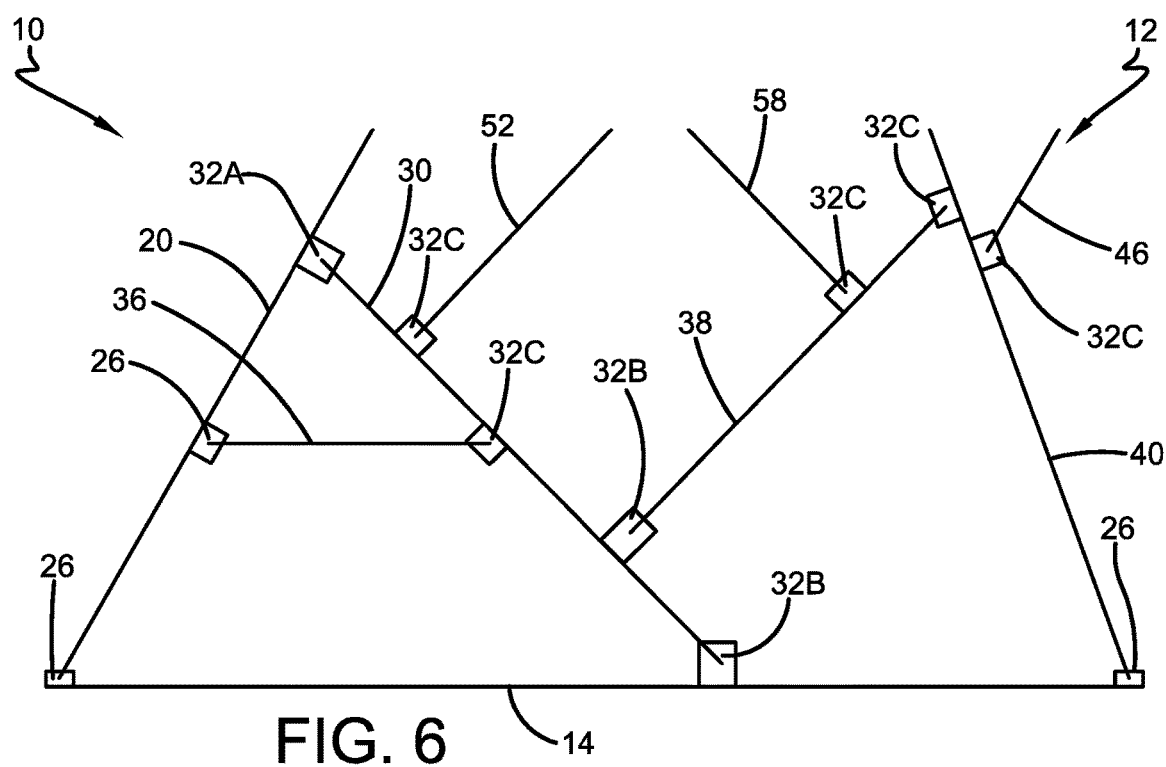
FIG. 6 is a schematic elevational view of a retractable canopy assembly made in accordance with other embodiments of the invention showing a retractable canopy frame in a first, open position.

As seen in FIG. 6, in one or more embodiments, retractable canopy frame 12 may include a third minor bow 58 coupled with and extending from first surfaces of connecting segments 38. In the same manner as first minor bow 46 and second minor bow 52, third minor bow 58 may be formed of a pair of straight bracket members joined by a curved member having a straight portion joining two curved portions. The straight bracket members each extend into a respective curved portion of the curved member. Third minor bow 58 may therefore be described as having an inverted U-shape. The coupling of the straight bracket members at first distal ends thereof with respective first surfaces of connecting segments 38 may be by way of respective rotation anchors 32C receiving permanent securement members 34.

Figure 7:
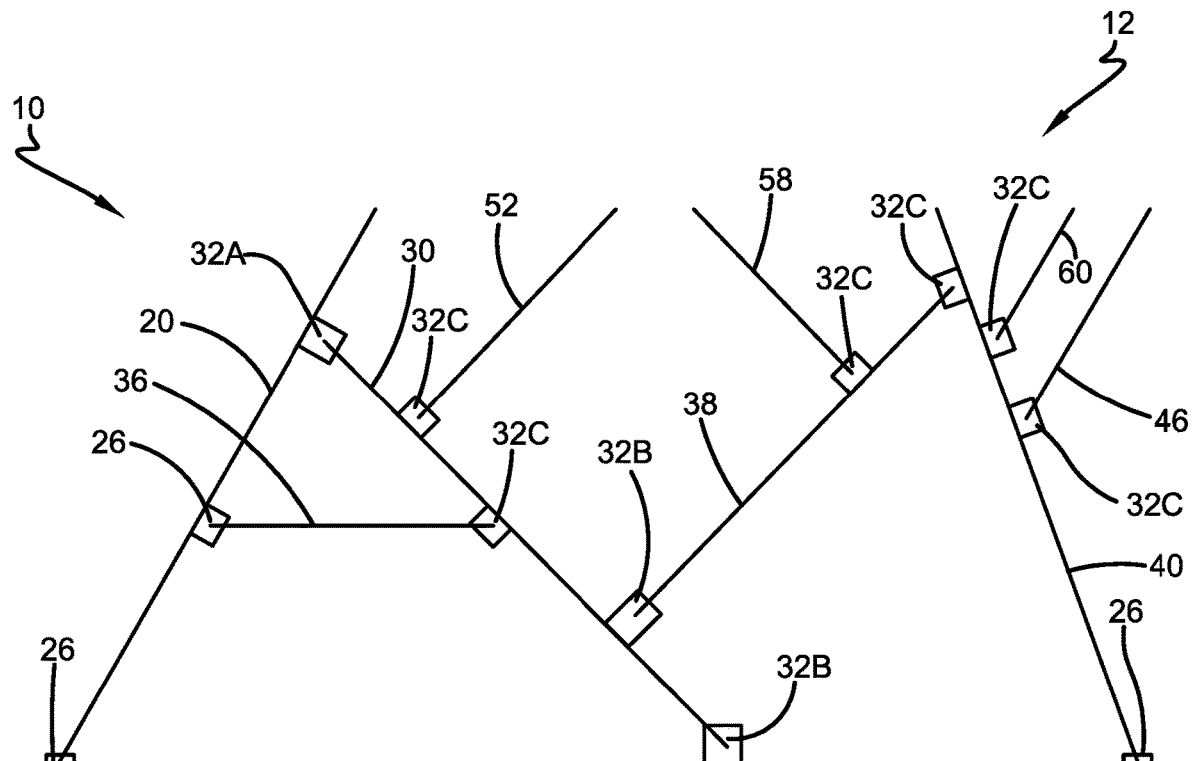
FIG. 7 is a schematic elevational view of a retractable canopy assembly made in accordance with other embodiments of the invention showing a retractable canopy frame in a first, open position.
Figure 8:
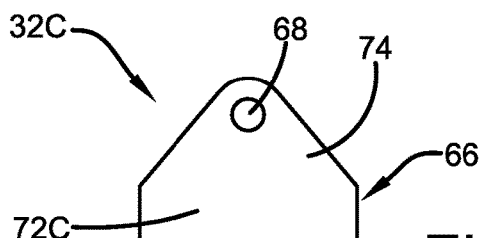
FIG. 8 is a front elevational view of a small anchor.
Figure 9:
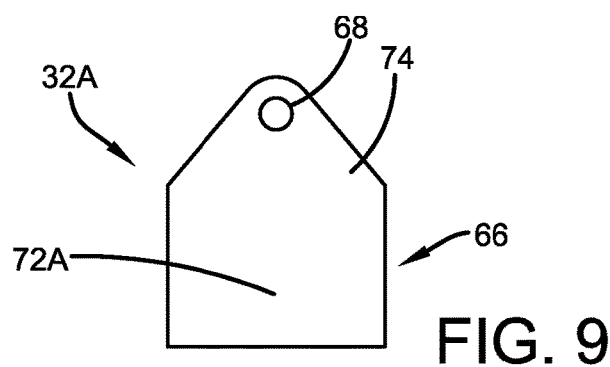
FIG. 9 is a front elevational view of a medium anchor.
Figure 10:
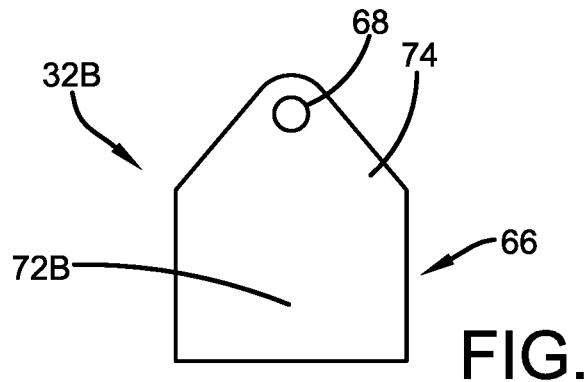
FIG. 10 is a front elevational view of a large anchor.
Figure 11:
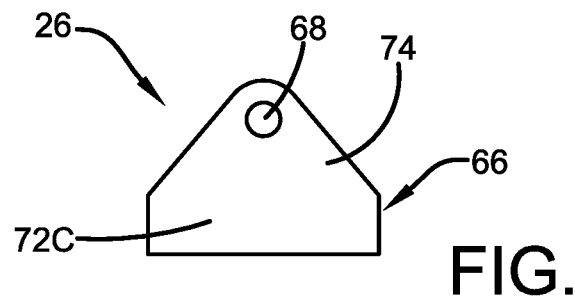
FIG. 11 is a front elevational view of a small anchor.
Figure 12:
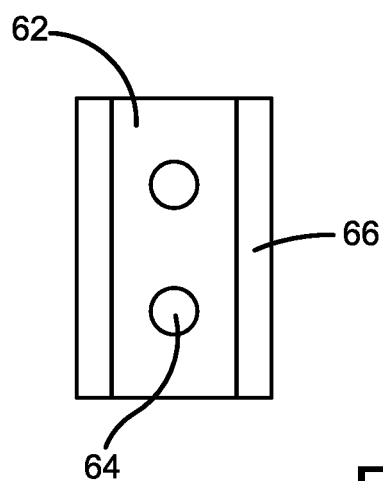
FIG. 12 is a top plan view of the anchors.

As seen in FIG. 7, in one or more embodiments, retractable canopy frame 12 may include a fourth minor bow 60 coupled with and extending from the second surface of second major bow 40. In the same manner as first minor bow 46 and second minor bow 52, fourth minor bow 60 may be formed of a pair of straight bracket members joined by a curved member having a straight portion joining two curved portions. The straight bracket members each extend into a respective curved portion of the curved member. Fourth minor bow 60 may therefore be described as having an inverted U-shape. The coupling of the straight bracket members at first distal ends thereof with the second surface of second major bow 40 may be by way of respective rotation anchors 32A receiving permanent securement members 34.

As described above, retractable canopy frame 12 includes a plurality of temporary anchors 26 and a plurality of rotation anchors 32A, 32B, 32C. As also set forth above, a difference between temporary anchors 26 and rotation anchors 32A, 32B, 32C is whether the securement member used with the respective anchors is removed for moving retractable canopy frame 12 between the first, open position and the second, closed position. That is, temporary anchors 26 and rotation anchors 32A, 32B, 32C may be characterized by the securement member they receive, and are otherwise structurally similar. Thus, for purposes of describing the structure of temporary anchors 26 and rotation anchors 32A, 32B, 32C, temporary anchors 26 and the rotation anchors 32A, 32B, 32C may be collectively referred to as "the anchors" and may also be characterized as brackets.

Figure 13:
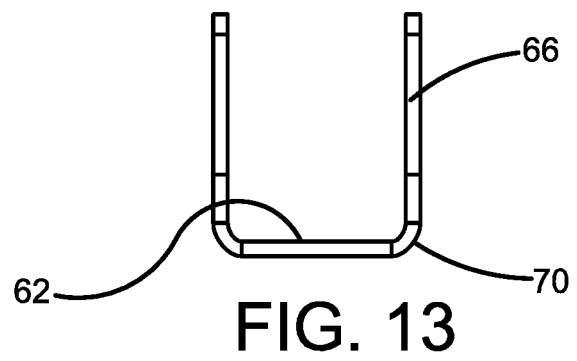
FIG. 13 is a side elevational view of the anchors.
Figure 14:
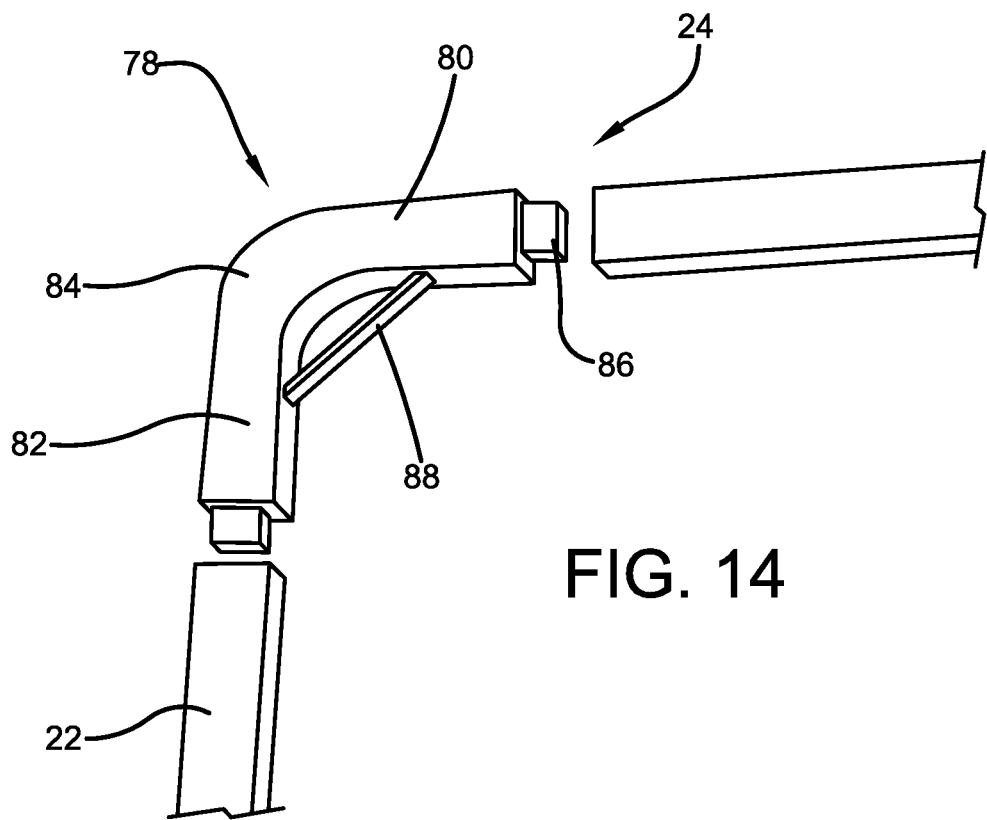
FIG. 14 is a perspective view of an elbow connection.
Figure 15:
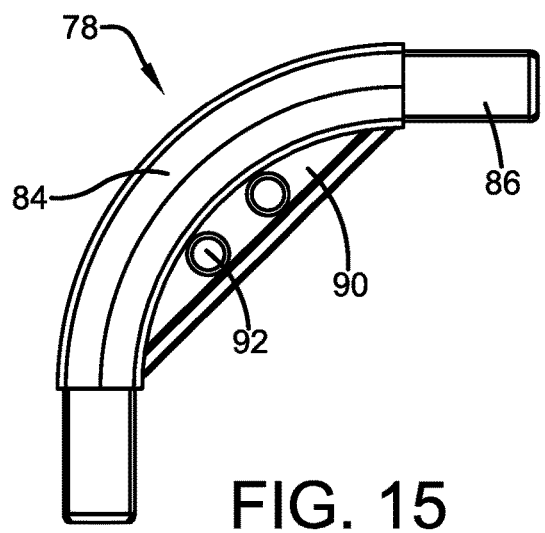
FIG. 15 is an elevational view of an alternative elbow connection.

The anchors include a base 62 having one or more mounting holes 64 and a pair of upright walls 66 having one or more securing holes 68. Base 62 is a planar section extending between the two parallel upright walls 66, which are arranged in a perpendicular manner such that a 90° angle is formed between each of walls 66 and base 62. Though FIG. 13 shows base 62 extending into walls 66 at a rounded corner 70, the connection between base 62 and walls 66 may also be a straight corner.

Walls 66 are formed as a body 72A, 72B, 72C extending from base 62. As shown in the Figures, body 72A, 72B, 72C may be a rectangular shape extending to a tapered end portion having symmetrical tapers 74. In other embodiments, body 72A, 72B, 72C may be a rectangular shape extending to form any suitable shape, such as rectangular, semi-oval, or semi-circle. In other embodiments, the entirety of body 72A, 72B, 72C may itself be characterized as forming any suitable shape, such as triangular (i.e. tapered), rectangular, semi-oval, or semi-circle.

As should be appreciated from FIG. 8 through FIG. 11, the anchors may be characterized by the size of body 72A, 72B, 72C. Retractable canopy frame 12 may utilize one or more anchors characterized as small anchors 32C, 26 having a small body 72C. The height of small body 72C may be in a range of from ½" to 2½", and in some embodiments, is a height of 2¼" or approximate thereto.

Retractable canopy frame 12 may utilize one or more anchors characterized as medium anchors 32A having a medium body 72A. The height of medium body 72A may be in a range of from 2¼" to 4", and in some embodiments, is a height of 3¾" or approximate thereto.

Retractable canopy frame 12 may utilize one or more anchors characterized as large anchors 32B having a large body 72B. The height of large body 72B may be in a range of from 3½" to 5½", and in some embodiments, is a height of 5¼" or approximate thereto.

Though temporary anchors 26 are shown in the Figures as having a small body 72C, in other embodiments, temporary anchors 26 may utilize a medium body 72A or a large body 72B. Though the Figures show certain sized anchors 32A, 32B, 32C in certain locations, it should be appreciated that in other embodiments anchors 32A, 32B, 32C may utilize other sizes as design of a particular retractable canopy frame 12 may require.

The distance between the parallel walls 66 (i.e. the width of base 62) may vary, and in one or more embodiments, this distance may be a distance approximately equal to the width of the respective mating piece (e.g. connecting segments 30) such that the anchors securely hold onto the mating piece with lateral movement of the mating piece being very limited. This distance between the parallel walls 66 and width of the respective mating piece should still allow rotational movement of the mating piece.

Base 62 is the portion of the anchors that directly secures the anchors to fixed frame 14 or to a respective bow or connecting segment of retractable canopy frame 12. As such, the width of base 62 may match, or substantially match, the width of the fixed frame 14 component (e.g. frame rail 76) or width of the respective bow or connecting segment of retractable canopy frame 12 to which the respective one of the anchors is secured. The inner width of base 62 will be the same, or substantially the same, width as the outer width of the respective component of retractable canopy frame 12 to which it is coupled.

Mounting holes 64 allow the anchors to be fixedly secured to either frame rail 76 or to the respective bow or connecting segment of retractable canopy frame 12 via one or more securement members, such as screws or bolts (with respective nut). The securement member extends first through a respective mounting hole 64 and then through either frame rail 76 or the respective bow or connecting segment of retractable canopy frame 12. This manner of securing the anchors allows removal of the anchors, if desired. However, if it is desired to permanently secure one or more of the anchors, they may be directly welded or otherwise permanently secured, usurping the need for mounting holes 64 and securement member.

As disclosed above, each of walls 66 includes a securing hole 68. Securing holes 68, which may also be described as bolt holes 68, of the two upright walls 66 are located such that a longitudinal axis parallel to base 62 extends through the center of securing holes 68. This allows a temporary securement member 28 or a permanent securement member 34 to be inserted through securing holes 68 and therefore extend therebetween.

As described above, certain of the anchors are temporary anchors 26 receiving temporary securement members 28. Exemplary temporary securement members 28 include clevis fasteners and snapper pins, which are generally known to those skilled in the art. Nut and bolt fasteners may also be used, though these may require additional disassembly time. Any of the temporary securement members may or may not include hollow cylinder sleeves around the central member.

As described above, certain of the anchors are rotation anchors 32A, 32B, 32C receiving permanent securement members 34. Exemplary permanent securement members 34 include nut and bolt fasteners. Clevis fasteners and snapper pins may also be used, though they would not need to be removed for moving retractable canopy frame 12 between the first, open position and the second, closed position. Any of the permanent securement members may or may not include hollow cylinder sleeves around the central member.

As shown in the Figures, the bows of retractable canopy frame 12 (e.g. first major bow 20) may be made from unitary, or integral, construction. In other embodiments, one or more of the bows may be made by coupling a respective end of each of the pair of straight bracket members (e.g. bracket members 22) with a respective end of the straight portion of the curved member (e.g. curved member 24) by way of a separate, curved corner member 78.

Curved corner member 78 includes a pair of arms 80, 82 extending outwardly from a central curved portion 84 at an angle of 90° or approximate thereto. The ends of arms 80, 82 are provided with a mating protrusion 86 that fits within a similarly sized channel (not seen) within the straight bracket member and the straight portion of the curved member, to securely mate the curved corner member 78 with the straight bracket member and the straight portion of the curved member as a combination piece. Mating protrusions 86 may be rectangular-prism shaped, cylindrically shaped, or have any other suitable shape. Curved corner member 78 may also include a support member 88 shaped as a rod or bar and extending between the pair of arms 80, 82.

In other embodiments, curved corner member 78 may be shaped without definitive arms 80, 82, such that the ends of central curved portion 84 are provided with mating protrusions 86. In these or other embodiments, a support member includes a body 90 formed along the interior perimeter of central curved portion 84. Body 90 may include one or more holes 92 therein.

Where utilized, curved corner members 78 to couple the straight bracket member and the straight portion of the curved member as a combination piece may provide for easier manufacturing and shipping of the various components of retractable canopy frame 12. The ease in manufacturing may arise from the ability to produce the straight bracket member and the straight portion of the curved member as straight pieces rather than forming a unitary piece (e.g. first major bow 20) having two curved portions. This use of curved corner members 78 may also allow for modification of retractable canopy frame 12 to a particular size of trailer 18 since the curved corner members 78 could be a constant size and the straight bracket member and the straight portion of the curved member could be cut to the necessary modified dimensions.

Retractable canopy frame 12 may be characterized by the dimensions thereof and by respective dimensions of the components thereof. In the open position, embodiments of the retractable canopy frame 12 may have a length of from 8 feet to 20 feet, in other embodiments, from 6 feet to 10 feet, in other embodiments, from 10 feet to 18 feet, and in other embodiments from 14 feet to 24 feet. In the open position, embodiments of the retractable canopy frame 12 may have a width of from 4 feet to 8 feet, in other embodiments, from 5 feet to 8 feet, and in other embodiments from 6 feet to 8 feet. In the open position, embodiments of the retractable canopy frame 12 may have a height of from 54 inches to 76 inches, in other embodiments, from 60 inches to 70 inches, in other embodiments, 60 inches or approximate thereto, and in other embodiments, 69 inches or approximate thereto.

Retractable canopy frame 12 may be characterized by the distance between the straight portion of the curved member of one bow and the straight portion of the curved member of the next proximate bow. In the open position, embodiments of the retractable canopy frame 12 may have a distance between the straight portion of the curved member of one bow and the straight portion of the curved member of the next proximate bow of less than 48 inches, in other embodiments, less than 45 inches, in other embodiments, less than 42 inches, and in other embodiments, less than 40 inches. The distance between each of the straight portions with the next proximate straight portion may be the same or different.

Suitable fixed frames 14 and transport apparatuses 18, such as trailer 18, are generally known to those skilled in the art. Fixed frame 14, which may be described as fixed frame 14, includes a lower frame member 94 surrounding and positionally corresponding to a flat support surface 96 of transport apparatus 18. A pair of parallel side sidewalls 98 extend upward at opposite sides of lower frame member 94. In one or more embodiments, a front wall 100 and a rear wall 102 extend upward at opposite ends of lower frame member 94. In one or more embodiments, rear wall 102 may be a ramp that has been folded upward for transport of transport apparatus 18.

Each of side sidewalls 98 extends to an upper frame member 76, which may be described as a frame rail 76. Frame rail 76 may protrude outwardly from side sidewalls 98 to provide suitable surface area for coupling anchors therewith. As mentioned above, certain of the anchors are coupled with fixed frame 14, such as with frame rail 76, and frame rail 76 may be sized to correspond with the anchors. In some embodiments, frame rail 76 may include holes for receiving securement members 34. In other embodiments, frame rail 76 may not include pilot holes, such as when securement members 34 are screws or when the anchors are welded to or otherwise secured with frame rail 76. In one or more embodiments, upper frame member 76 may also form a top portion of front wall 100 and rear wall 102, when present.

Fixed frame 14 may be of any suitable dimensions corresponding to retractable canopy frame 12. Fixed frame 14 may include a plurality of securing apparatuses 104, such as straps 104, for securing cover 16 with fixed frame 14. As generally known in the art, securing apparatuses 104 may include a buckle or snap for coupling with respective securing apparatuses 106, such as straps 106, provided by cover 16. Securing apparatuses 106 may include a respective buckle or snap corresponding with a buckle or snap of securing apparatuses 104. In some embodiments, only cover 16 is provided with securing apparatuses 106, and securing apparatuses 106 are wrapped around one or more components of fixed frame 14 for securing cover 16 with fixed frame 14. The number of securing apparatuses 104 and securing apparatuses 106 may be selected to provide proper support depending on the dimensions of cover 16 and transport apparatus 18. Other exemplary securing apparatuses are generally known to the skilled persons, and other particular examples include hooks and cords.

As disclosed above, retractable canopy frame 12 may carry canopy 16 for a particular purpose of covering and protecting contents within transport apparatus 18 when retractable canopy frame 12 is in the first, open position. This may also be characterized as canopy 16 extending over retractable canopy frame 12.

Figure 18:
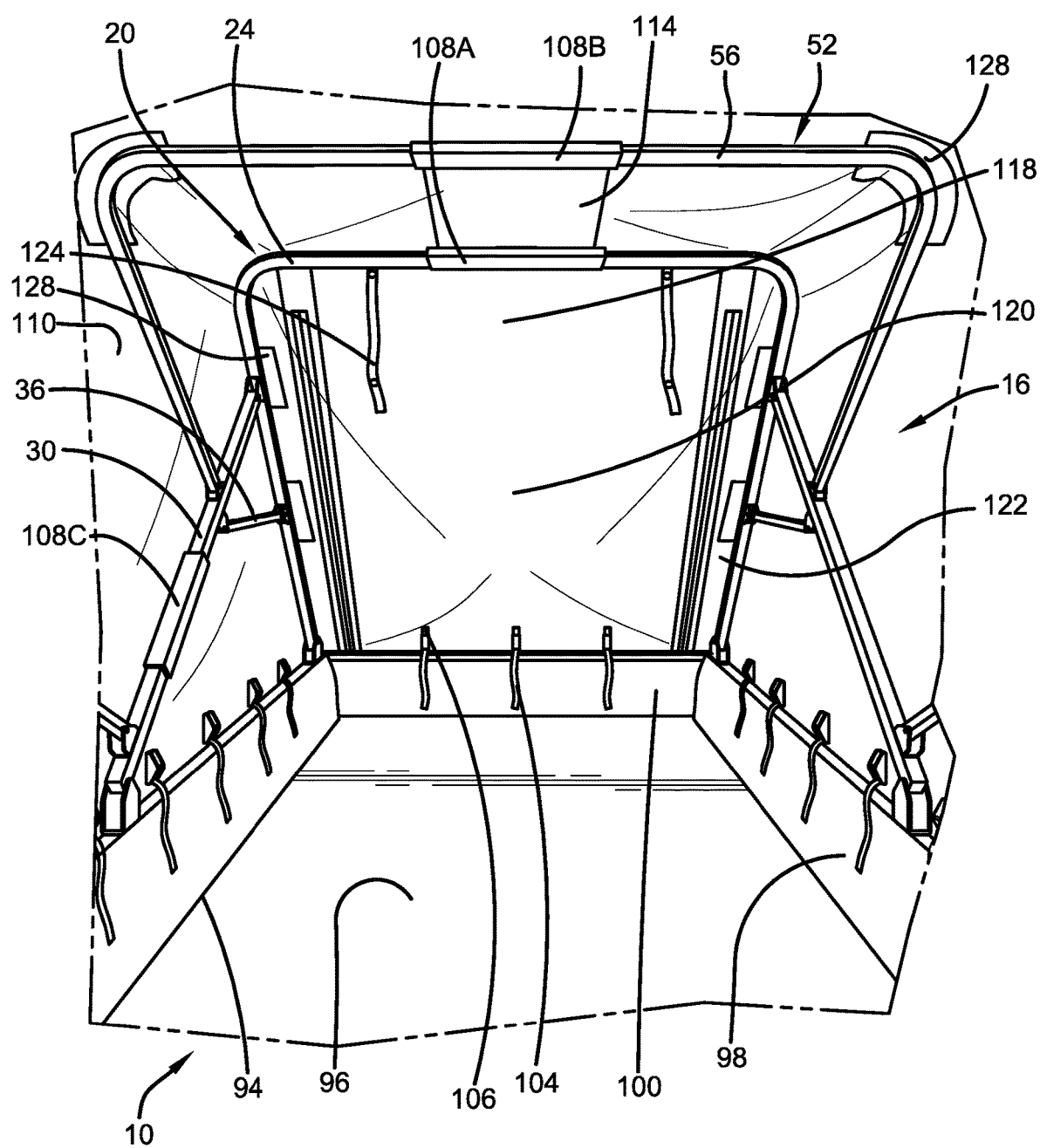
FIG. 18 is a perspective view showing the interior of the canopy, with the retractable canopy frame in the open position.

As seen in FIG. 18, canopy 16 includes a plurality of channels 108A, 108B, 108C formed within the interior of canopy 16. Channels 108A, 108B, 108C which may also be described as pockets 108A, 108B, 108C, are shaped such that a respective component of retractable canopy frame 12 fits within the opening of channels 108A, 108B, 108C. For example, the straight portion of curved member 24, or at least a portion thereof, may fit within the opening of channel 108A, the straight portion of curved member 56, or at least a portion thereof, may fit within the opening of channel 108B, and connecting segment 30, or at least a portion thereof, may fit within the opening of channel 108C. Channels 108A, 108B, 108C may be sown into the interior of canopy 16, or otherwise formed into the interior of canopy 16 by any suitable manner.

Figure 17:
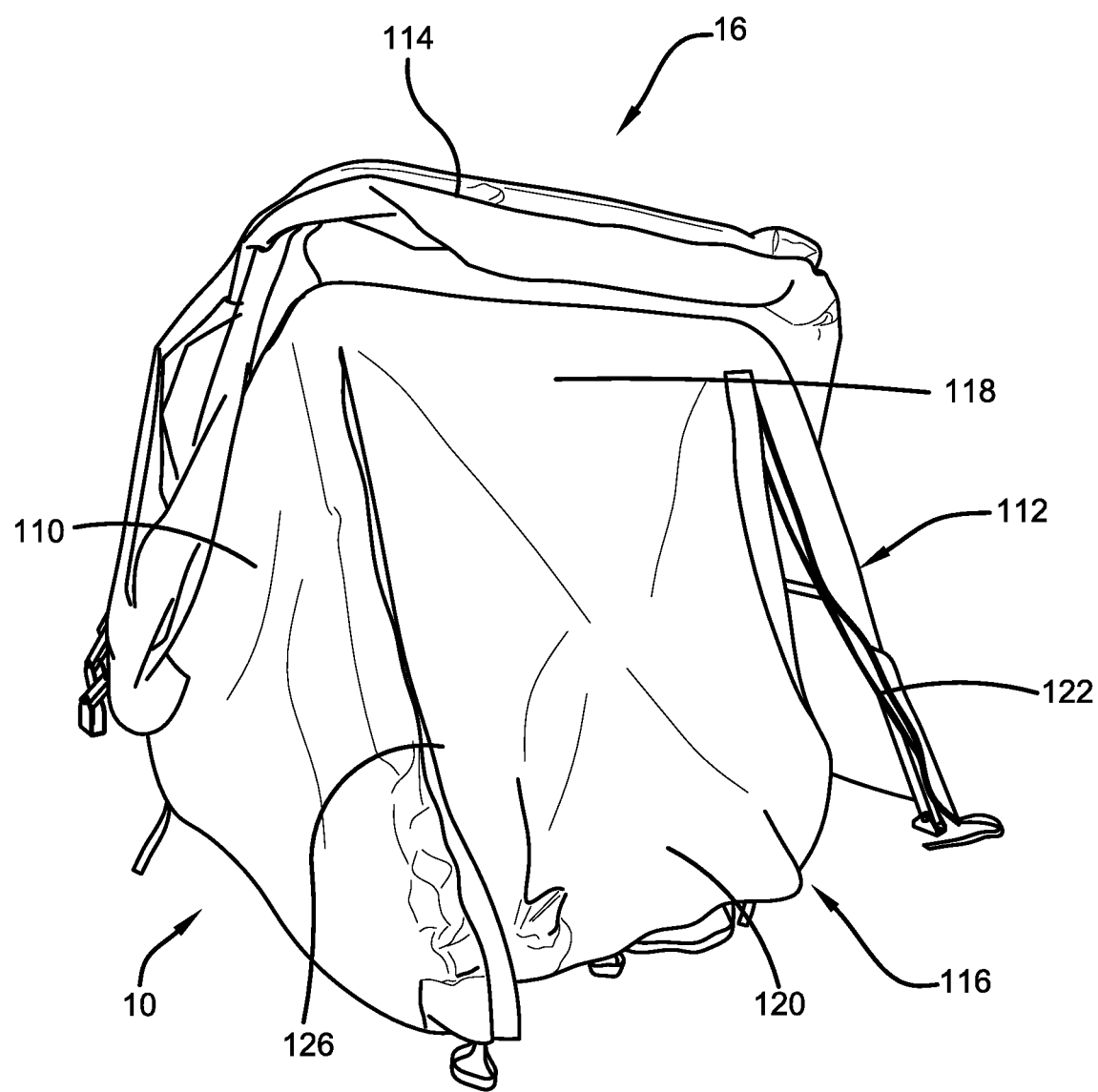
FIG. 17 is a perspective view showing a front flap of the canopy, with the retractable canopy frame in a position between the open position and the closed position.

It should be appreciated that canopy 16 may include any suitable number of channels 108A, 108B, 108C corresponding with any suitable component, or portions of components, of retractable canopy frame 12. Channels 108A, 108B, 108C also ensure that minor bows stay in the angled position when retractable canopy frame 12 is in the open position. The number and position of channels 108A, 108B, 108C may also ensure canopy 16 is sturdily secured with retractable canopy frame 12 such that canopy 16 will correspondingly move with retractable canopy frame 12 when retractable canopy frame 12 moves between the open position and the closed position. FIG. 17 shows canopy 16 correspondingly moving with retractable canopy frame 12 when retractable canopy frame 12 is between the open position and the closed position. In certain embodiments, canopy 16 does not need to be removed from retractable canopy frame 12 to move retractable canopy frame 12 between the open position and the closed position.

In certain embodiments, all of the straight portions, or at least portions thereof, of the curved members of the bows are included within a respective channel 108A, 108B. In certain embodiments, at least portions of all of the bows and connecting segments of retractable canopy frame 12 corresponding with the sides of cover 16 are included within a respective channel 108C. In other embodiments, at least portions of only a portion of the bows and connecting segments of retractable canopy frame 12 corresponding with the sides of cover 16 are included within a respective channel 108C. In certain embodiments, every bow and connecting segment of retractable canopy frame 12 includes at least a portion thereof within a respective channel 108A, 108B, 108C. Channels 108C formed in the sides of cover 16 may be particularly useful for limiting the fluttering or billowing of cover 16 caused by wind.

In some embodiments, channels 108A, 108B, 108C are formed as unitary components and the respective components of retractable canopy frame 12 are inserted within channels 108A, 108B, 108C during assembly of retractable canopy frame 12. In other embodiments, channels 108A, 108B, 108C may be provided with a temporary fastener, such as a zipper, hook and loop fasteners, or snaps. In these embodiments, retractable canopy frame 12 may be entirely built and then cover 16 may be subsequently added to retractable canopy frame 12. Cover 16 may then be removed from retractable canopy frame 12 without disassembling retractable canopy frame 12.

Figure 16:
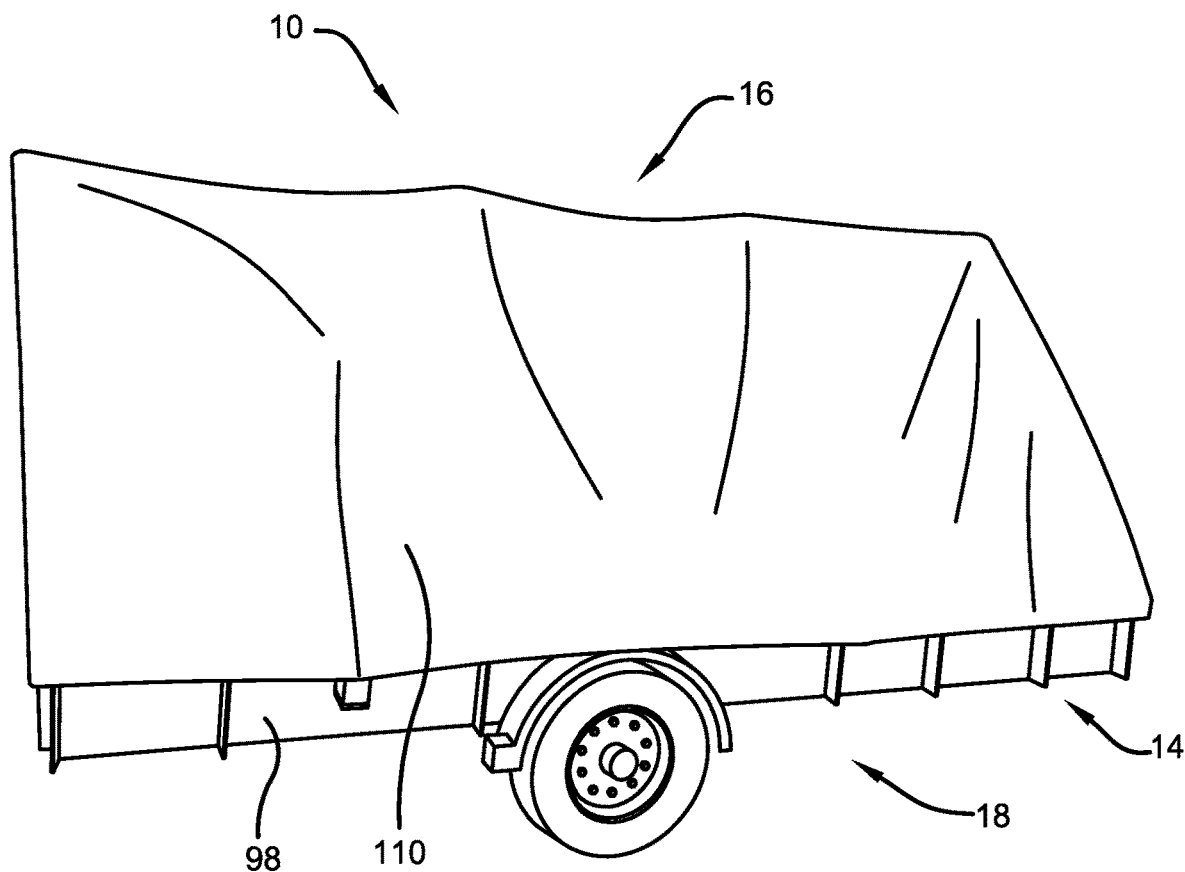
FIG. 16 is a perspective view showing a canopy on a retractable canopy frame in an open position.

As seen in FIG. 16, in the open position of retractable canopy frame 12, the shape of cover 16 corresponds with the exterior perimeter of retractable canopy frame 12. In the open position of cover 16, the shape of cover 16 may be described as a rectangular prism, or a substantial rectangular prism, extending to a right triangular prism, or substantial right triangular prism, at one end. In certain embodiments, the shape of cover 16 may be described as a rectangular prism, or a substantial rectangular prism, extending to a right triangular prism, or substantial right triangular prism, at both ends. Cover 16 may be said to include a pair of side surfaces 110, a front surface 112, a rear surface (not seen), each extending downward from a respective part of a top surface 114. Pair of side surfaces 110 each extend between front surface 112 and the rear surface.

As seen in FIG. 16, in the open position of retractable canopy frame 12, side surfaces 110, front surface 112, and the rear surface of cover 16 may extend downward a sufficient distance as to cover, or overlap with, the top of fixed frame 14. Any suitable portion of fixed frame 14 may be covered by cover 16, such that contents within transport apparatus 18 are protected from sight and from the weather. In certain embodiments, the portions of cover 16 overlapping fixed frame 14 may be reinforced with additional material. In certain embodiments, the portions of cover 16 overlapping fixed frame 14 may include securing apparatuses 106.

Either or both of front surface 112 and the rear surface of cover 16 may include access assemblies to allow quicker access to the contents of transport apparatus 18. The access assemblies include a flap 116 having a fixedly secured portion 118 extending into a temporarily secured portion 120. Fixedly secured portion 118 may be a unitary extension of the material from the top surface. In other embodiments, fixedly secured portion 118 may be sewed. It should be appreciated that the term "fixedly" as used herein with "fixedly secured portion" may be defined as this portion stays secured in order to access the contents of transport apparatus 18. That is, in certain embodiments, fixedly secured portion 118 may be secured by a temporary fastener, such as a zipper, hook and loop fastener, or snaps, but this temporary fastener may stay fastened in order to access the contents of transport apparatus 18.

Each vertical side of temporarily secured portion 120 is removably secured with a respective fastening portion 122. When temporarily secured portion 120 is secured with fastening portions 122, cover 16 forms an enclosed space. The securement of temporarily secured portion 120 with fastening portions 122 may be achieved by any suitable temporary fastener, such as a zipper, hook and loop fastener, or snaps. When temporarily secured portion 120 is removed from fastening portions 122, temporarily secured portion 120 may be moved, such as by folding or rolling, to allow a user to access the contents of transport apparatus 18. In certain embodiments, temporarily secured portion 120 may be rolled upwardly and secured with one or straps 124.

In certain embodiments, temporarily secured portion 120 may include an overlapping portion 126 at each vertical side that will overlap with the respective fastening portion 122 to protect the temporary fastener. As an example, where temporarily secured portion 120 includes first zipper interlocks of a zipper and fastening portions 122 include second zipper interlocks of a zipper, overlapping portion 126 may include the hooks of a hook and loop fastener and fastening portion 122 may include the loops of a hook and loop fastener, such that the hook and loop fastener could be secured to protect the zipper. In certain embodiments, particularly where the temporary fastener is weatherproof, overlapping portions 126 may not be present.

In certain embodiments, either or both of front surface 112 and the rear surface of cover 16 may include a mesh window, which may be positioned in an area approximating the top center. In other embodiments, a complete mesh panel may be provided such that temporarily secured portion 120 could be rolled up and the mesh panel secured in its place. Where present, the mesh would allow some wind to flow through cover 16 during transport, which would serve to reduce the wind load on cover 16, while also preventing certain debris, such as bugs, from entering. In certain embodiments, the mesh can include a solid second layer behind the mesh in order to prevent rain from soaking the contents of transport apparatus. The solid second layer may open at the bottom for the wind and or water to escape.

In certain embodiments, portions of the interior of cover 16 may be protected by reinforcing material 128. Reinforcing material 128 may be extra material, such as fabric, where cover 16 particularly touches the brackets. Reinforcing material 128 may be provided at particular points of stress within cover 16. In certain embodiments, reinforcing material 128 is present at all of the curved portions, or at least portions thereof, of the curved members of the bows. In one or more embodiments, reinforcing material 128 is present at all of the anchors. In certain embodiments, reinforcing material 128 may be provided with cover 16 when manufactured. In these or embodiments, reinforcing material 128 may be added to cover 16 as patches after manufacturing.

In one or more embodiments, the interior of cover 16 may include a 3-sided pocket, which may or may not include a closing mechanism, such as a zipper or snap, at the top. The 3-sided pocket may be utilized to hold paperwork or small items.

As described above, the components of retractable canopy frame 12 are designed with suitable lengths and relative angles such that retractable canopy frame 12 can move between the open position and the closed position. When moving between the open position and the closed position, the respective components of retractable canopy frame 12 should not interfere with the movement of other components.

As mentioned above, retractable canopy assembly 10 and retractable canopy frame 12 may be characterized as having a first position, which may also be described as a deployed position or open position. The deployed position of retractable canopy frame 12 may be characterized by the angle of straight bracket members 22. In one or more embodiments, the angle of straight bracket members 22 with respect to fixed frame 14 may be from about 40° to about 60°, in other embodiments, from about 45° to about 55°, in other embodiments, from about 50° to about 70°, in other embodiments, from about 55° to about 65°. In one or more embodiments, the angle of straight bracket members 22 with respect to fixed frame 14 may be about 65°, in other embodiments, about 60°, in other embodiments, about 55°, and in other embodiments, about 50°.

As mentioned above, retractable canopy assembly 10 and retractable canopy frame 12 may be characterized as having a second position, which may also be described as a closed position or a stored position. Starting from the open position of retractable canopy frame 12, for moving retractable canopy frame 12 to the closed position, temporary securement members 28 are removed from temporary anchors 26. This frees the respective components for movement, such that rotation of those components and other components may occur.

Figure 4:
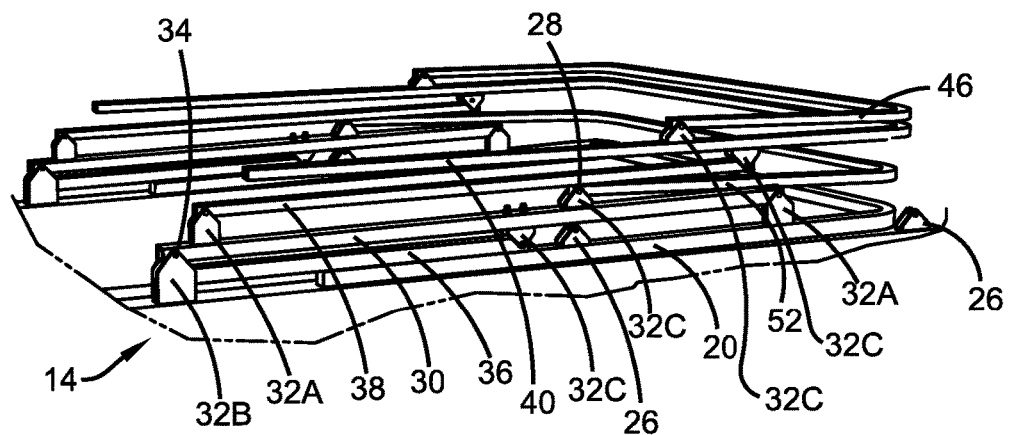
FIG. 4 is a partial perspective view of the retractable canopy frame of FIG. 3 in the second, closed position.

As seen in FIG. 4, first major bow 20 is moved into place and lays flat proximate fixed frame 14, particularly a rear portion of fixed frame 14. Based on the respective coupling with other components of retractable canopy frame 12, the movement of first major bow 20 also causes certain travel of the other components. Generally speaking, movement of first major bow 20 alone will not place retractable canopy frame 12 in the position of FIG. 4; all components of retractable canopy frame 12 should be manipulated individually as necessary.

Connecting segments 36 are proximate first major bow 20, with connecting segments 30 also proximate connecting segments 36. Second minor bow 52 is proximate connecting segments 30 with connecting segments 38 also proximate second minor bow 52. Second major bow 40 is proximate connecting segments 38 with first minor bow 46 also proximate second major bow 40.

It should thus be appreciated that retractable canopy frame 12 can be easily moved between the open position and the closed position. This movement may be generally characterized as accordion-type fashion. As described above, this movement between the open position and the closed position can also include retaining cover 16 with retractable canopy frame 12.

Figure 19:
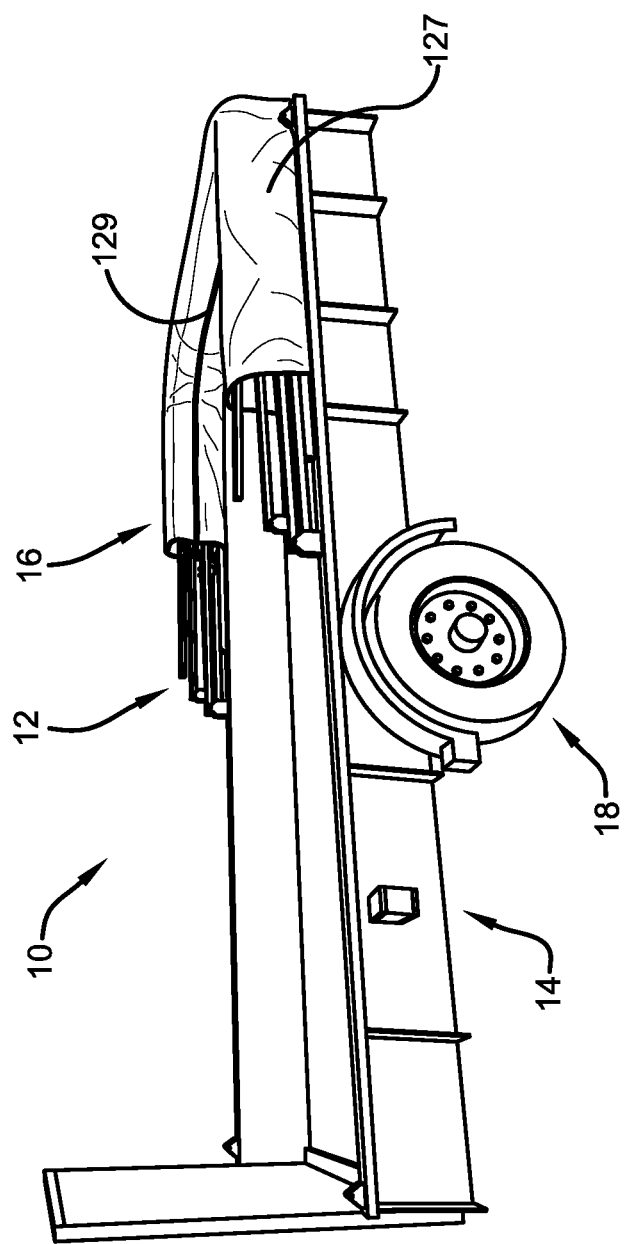
FIG. 19 is a perspective view showing the canopy on the retractable canopy frame in the closed position, shown with a protective jacket for the canopy and the frame.

In one or more embodiments, retractable canopy assembly 10 includes a protective jacket 127 (FIG. 19) for protecting cover 16 and retractable canopy frame 12 when retractable canopy frame 12 is in the closed position. Protective jacket 127, which may also be described as a boot 127, may be formed as a U-shape having a securing mechanism 129, such as a zipper 129, for retaining protective jacket 127 in position. Securing mechanism 129 may be particularly located on the interior of protective jacket 127.

In one or more embodiments, retractable canopy assembly 10 includes a retaining sleeve 130 (FIG. 20) for maintaining retractable canopy frame 12 in the closed position. Retaining sleeve 130, which may be referred to as retaining strap 130, includes a pair of opposed side surfaces 132 extending from a base 134. Retaining sleeve 130 is foldable about base 134 such that base 134 may be placed on top of second major bow 40 and opposed side surfaces 132 may be made to extend therefrom.

Each opposed side surface 132 includes a hole there through such that the position of the holes correspond to receive a temporary securement member 28, as described above. Advantageously, one of the temporary securement members 28 that would have been utilized to maintain retractable canopy frame 12 in the open position can be utilized with retaining sleeve 132. In other embodiments, an independent temporary securement member 28 is provided.

With temporary securement member 28 in place, such as through the holes of opposed side surfaces 132 and the holes within first major bow 20, the interior surface of opposed side surfaces 132 and base 134 are proximate the various components of retractable canopy frame 12 for retention thereof.

Figure 20:
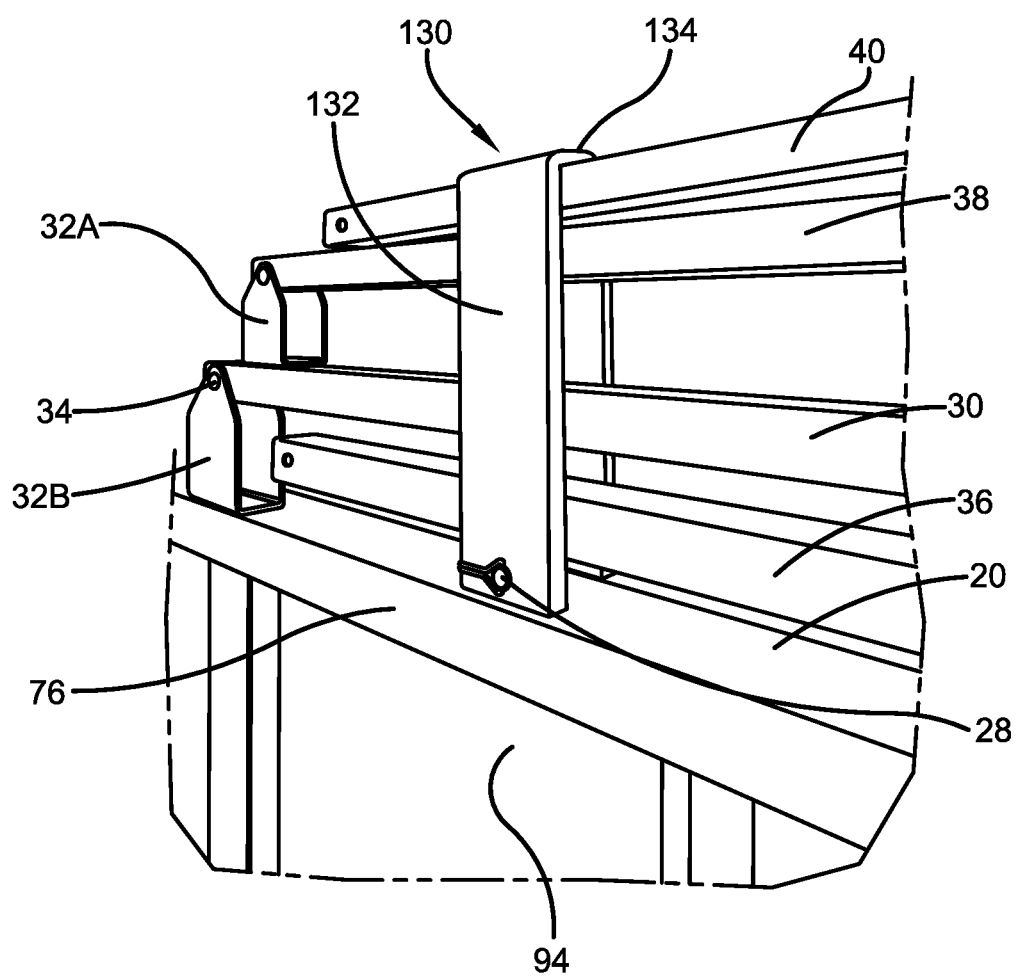
FIG. 20 is a perspective view showing a retaining sleeve securing the retractable canopy frame in the closed position.

In certain embodiments, a component of fixed frame 14 includes one or more holes therethrough for receiving temporary securement member 28 of retaining strap 130. In certain embodiments, temporary securement member 28 of retaining strap 130 may be used without passing through a component of retractable canopy frame 12. That is, retaining strap 130 may be in a position other than as shown in FIG. 20 and temporary securement member 28 may just pass through each opposed side surfaces 132.

In one or more embodiments, retractable canopy assembly 10 includes a rock guard 136 (FIGS. 21 and 22) positioned at the front end of transport apparatus. Rock guard 136, which may also be referred to as deflector shield 136, deflects stones and road debris that might otherwise cause damage to the contents of transport apparatus 18 if the debris is able to overcome the integrity of cover 16. Rock guard 136 also allows for taller and wider contents, such as certain all-terrain vehicles, to be utilized with transport apparatus 18. With rock guard 136 in place, the vertical area towards the front of cover 16 is raised based on anchors 26 positioned at a higher location than when rock guard 36 is not present. Based on the raised position, the angle of straight bracket members 22 with respect to fixed frame 14 may be higher, for example from about 30° to about 50°, than if rock guard 136 is not present. This increase in angle may also have an advantage of improved wind deflection.

Rock guard 136 may include a base wall 138 having a side wall 140 extending from each end thereof. The bottoms of base wall 138 and side walls 140 may be coupled with the top of fixed frame 14. The interiors of base wall 138 and side walls 140 define an opening in which a portion of the front wheels or front wheel of a vehicle, such as an all-terrain vehicle or motorcycle, may be placed when utilized inside transport apparatus 18.

Figure 21:
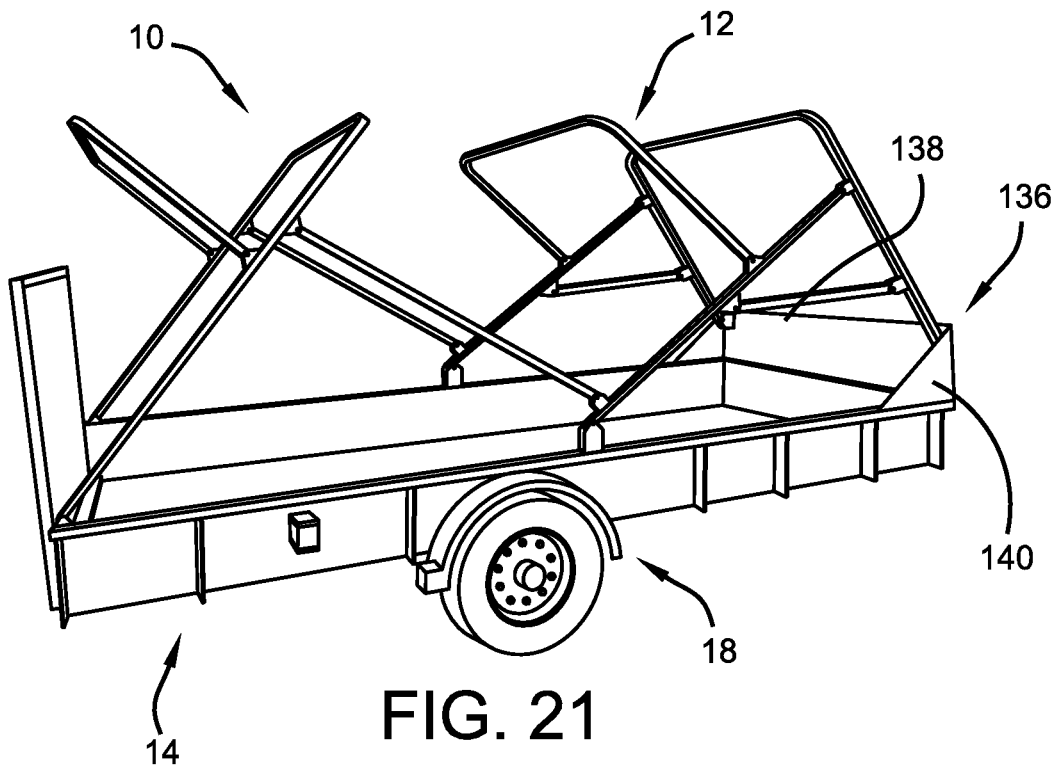
FIG. 21 is a perspective view showing a rock guard.
Figure 22:
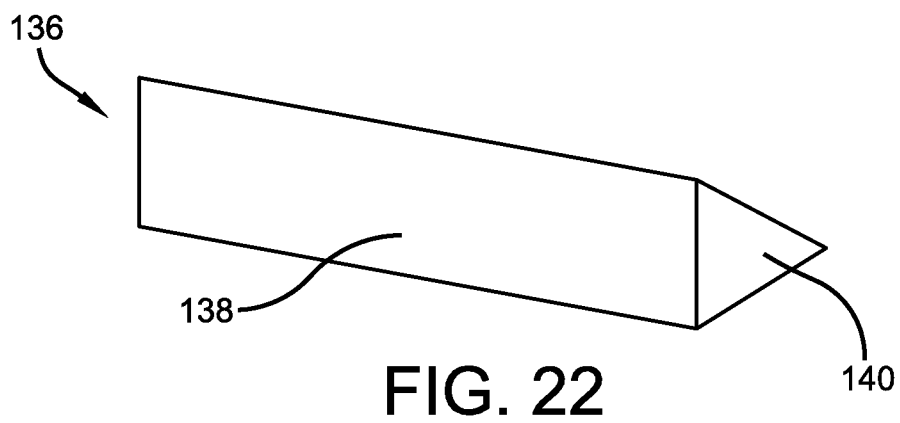
FIG. 22 is a perspective view of the rock guard.

When rock guard 136 is present, the respective anchors may be coupled with rock guard 136 rather than fixed frame 14, as shown in FIG. 21. The anchors may be attached as high and wide as possible on the inside of base wall 138 so that the top edge of the anchors is flush with the top edge of base wall 138. In these embodiments, these anchors are oriented vertically.

As generally known to those skilled in the art, components of retractable canopy assembly 10 may be made be made of any suitable material. As examples, retractable canopy frame 12 may be made out of metal, e.g. aluminum and steel, and may be hollow or solid. As examples, curved corner members 78 may be made from metal, e.g. aluminum and steel, or plastic, and may be hollow or solid. As examples, cover 16 and protective jacket 127 may be made from flexible, weather resistant material such as plastic, e.g. coated vinyl, or fabric, e.g. canvas. As examples, retaining sleeve 130 may be made from flexible metal, flexible plastic, rubber, or fabric.

In certain embodiments, retractable canopy frame 12 may be provided to a user for placement on an existing transport apparatus 18, that is, subsequent to the manufacture and purchase of the transport apparatus 18, without modification to the transport apparatus 18 other than steps necessary for the addition of retractable canopy frame 12. Where a user may add retractable canopy frame 12 to an already-purchased transport apparatus 18, retractable canopy frame 12 may be accompanied with particular instructions for attachment to transport apparatus 18. In other embodiments, retractable canopy frame 12 may be placed on a transport apparatus 18, such as fixed frame 14 thereof, as part of the manufacturing process.

Embodiments of the present invention possess industrial applicability as providing retractable canopy assemblies having a retractable canopy frame that may be particularly useful for covering and protecting contents within a transport apparatus to which the retractable canopy frame is coupled. Embodiments of the present invention also provide certain advantages over conventional art: a retractable canopy frame and canopy that more quickly and conveniently transition between an open position and a closed position, a retractable canopy frame and canopy that extend higher in the forward space and the rearward space above a transport apparatus, a retractable canopy frame and canopy that are more compactly closed when in the closed position, and a retractable canopy frame and canopy that provide less weight to a transport apparatus.

In light of the foregoing, it should be appreciated that the present invention advances the art by providing a retractable canopy assembly suitable for a particular purpose of covering and protecting contents within a transport apparatus. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A retractable canopy assembly comprising
a pair of fixed frame sidewalls each having a front end, a central portion, and a rear end,
a retractable canopy frame having
a first bow having a pair of first bow straight bracket members joined by a first bow curved member,
a second bow having a pair of second bow straight bracket members joined by a second bow curved member, and
a pair of connecting segments each having a first distal end coupled with the central portion of a respective sidewall of the pair of sidewalls and a second distal end coupled with a respective first bow straight bracket member of the pair of first bow straight bracket members,
wherein, in a first, open position of the retractable canopy frame, the pair of first bow straight bracket members are coupled with the front end of a respective sidewall of the pair of sidewalls, and the pair of second bow straight bracket members are coupled with the rear end of a respective sidewall of the pair of sidewalls,
wherein, in a second, closed position of the retractable canopy frame, the pair of first bow straight bracket members, the pair of second bow straight bracket members, and the pair of connecting segments are at least substantially parallel with a respective sidewall of the pair of sidewalls.

2. The retractable canopy assembly of claim 1, the first bow curved member including a straight portion and the second bow curved member including a straight portion, a front fixed frame wall extending between the pair of fixed frame sidewalls, wherein, in the second, closed position of the retractable canopy frame, the straight portion of the first bow curved member and the straight portion of the second bow curved member are at least substantially parallel with the front fixed frame wall.

3. The retractable canopy assembly of claim 2, the pair of sidewalls and the front fixed frame wall being provided by a transport apparatus adapted to receive contents therein, the retractable canopy frame carrying a canopy to thereby cover and protect the contents within the transport apparatus when retractable canopy frame is in the first, open position.

4. The retractable canopy assembly of claim 3, the canopy traveling with the retractable canopy frame when retractable canopy frame is moved between the first, open position and the second, closed position.

5. The retractable canopy assembly of claim 4, the canopy having an interior with a plurality of channels formed therein, at least a portion of the straight portion of the first bow curved member positioned in a first channel of the plurality of channels, and at least a portion of the straight portion of the second bow curved member positioned in a second channel of the plurality of channels.

6. The retractable canopy assembly of claim 5, the plurality of channels including temporary fasteners, such that the retractable canopy frame is completely assembled prior to positioning the portion of the straight portion of the first bow curved member in the first channel and the portion of the straight portion of the second bow curved member in the second channel.

7. The retractable canopy assembly of claim 5, the plurality of channels being formed as unitary components, such that the portion of the straight portion of the first bow curved member and the portion of the straight portion of the second bow curved member are positioned in the first channel and the second channel, respectively, prior to complete assembly of the retractable canopy frame.

8. The retractable canopy assembly of claim 2, the straight portion of the first bow curved member extending between two curved first bow portions and having a channel at an end thereof, the pair of first bow straight bracket members having a channel at an end thereof, the curved first bow portions having a mating protrusion at each end thereof, the mating protrusions adapted to securely mate with a respective one of the channels.

9. A retractable canopy assembly comprising
a fixed frame,
a retractable canopy frame having
a first major bow removably coupled with the fixed frame and removably coupled with a first pair of connecting segments,
the first pair of connecting segments further fixedly coupled with a second pair of connecting segments,
the second pair of connecting segments further fixedly coupled with the first major bow, the fixed frame, and a third pair of connecting segments,
the third pair of connecting segments further fixedly coupled with a second major bow,
the second major bow further removably coupled with the fixed frame,
wherein the removable coupling of the first major bow with the fixed frame, the first major bow with the first pair of connecting segments, and the second major bow with the fixed frame are such that the retractable canopy frame is movable between an open position and a closed position.

10. The retractable canopy assembly of claim 9, wherein the removable coupling being coupled defines the open position and the removable coupling being uncoupled defines the closed position.

11. The retractable canopy assembly of claim 10, wherein the second major bow is further fixedly coupled with a first minor bow.

12. The retractable canopy assembly of claim 11, wherein the second pair of connecting segments are further fixedly coupled with a second minor bow.

13. The retractable canopy assembly of claim 12, wherein the third pair of connecting segments are further fixedly coupled with a third minor bow.

14. The retractable canopy assembly of claim 13, wherein the second major bow is further fixedly coupled with a fourth minor bow.

15. The retractable canopy assembly of claim 10, wherein the removable coupling of the first major bow with the fixed frame, the first major bow with the first pair of connecting segments, and the second major bow with the fixed frame include respective anchors each having a base with one or more mounting holes adapted to receive a securement member to thereby fixedly secure the anchors to the respective component, and a pair of upright walls extending from the base and each having a securing hole to thereby receive a temporary securement member.

16. The retractable canopy assembly of claim 15, wherein the temporary securement members positioned in the securing holes defines the removable coupling being coupled, and wherein the temporary securement members not positioned in the securing holes defines the closed position.

17. The retractable canopy assembly of claim 16, further comprising a retaining sleeve to thereby retain the retractable canopy frame in the closed position, the retaining sleeve including a pair of opposed side surfaces foldable about a base, each of the opposed side surfaces including a hole for receiving one of the temporary securement members when not positioned in the securing holes.

18. The retractable canopy assembly of claim 17, the temporary securement members selected from the group consisting of clevis fasteners and snapper pins.

19. The retractable canopy assembly of claim 9, further comprising a U-shaped protective jacket for protecting the retractable canopy frame when retractable canopy frame is in the closed position.

* * * * *